UNITED STATES PATENT OFFICE.

CENEK LORENC, OF KÖNIGL WEINBERGE, AUSTRIA-HUNGARY.

FIRE AND DRY-ROT PROOF AIR-TIGHT MASONRY, &c.

SPECIFICATION forming part of Letters Patent No. 676,507, dated June 18, 1901.

Application filed February 4, 1901. Serial No. 46,009. (No specimens.)

*To all whom it may concern:*

Be it known that I, CENEK LORENC, of Königl Weinberge, near Prague, Bohemia, Empire of Austria-Hungary, have invented certain new and useful Improvements in the Art or Process of Building Masonry and in Masonry, of which the following is a specification.

This invention relates to an improvement in the art of building masonry and to the masonry itself.

The main object of the invention is to increase the strength of masonry from stone or brick and mortar.

According to my process I select building material (stone or brick) of any suitable degree of strength—for example, good clay bricks, which have a tensile strength of twenty to forty kilograms per square centimeter, or fire-brick burned extra clean, which have a tensile strength of forty to one hundred and thirty kilograms per square centimeter, or stone having a known strength. I then select or prepare a mortar for the joints of the masonry—that is, for connecting the stone or brick together—which when dried has at least as great strength as the stone itself. Pure soluble-glass-trass cement without admixture of sand has a strength of eighty to one hundred kilograms per square centimeter. By adding sand or sand and other material in proper proportions the cement or mortar is given the proper strength.

One mortar or soluble-glass-trass plaster which I may use is composed of one part, in volume, of Portland or other cement, lime, or plaster, one-sixth to one part of trass matter, one one-hundredth to one-fifth part of infusorial earth saturated with soluble glass, and 0.4 part of filling material in sand or powder form. The soluble-glass powder is produced from infusorial earth saturated with a soluble-glass solution and after drying finely pulverized.

In the grinding of the soluble-glass-trass cement or soluble-glass-trass plaster it is mixed with natural or artificial cements or limes or plaster-like trass materials and with infusorial earth which has been previously soaked in soluble-glass solution and then dried, which materials are ground together so finely by means of roller-mills, and then by means of fan-separators so sieved, that they leave no remainder on a sieve having from four thousand nine hundred to five thousand meshes per square centimeter.

To get mortar having desired pressure-resisting qualities, I may mix with the soluble-glass-trass cement or plaster one or more of the following materials: sand, ashes, volcanic stones, and sand in powdered form, marble sand or powder, raw limestone powder or sand, burnt clay or mud in sand or powder form, glass sand or powder, alum slate, clinkers, talc slate, iron sand, chalk, finely-sieved manganese-powder, slag, silica guhr, substances containing sulfur, or lime slaked with calcium chlorid and used while still hot.

To get a mortar which is of the desired tensile strength, I may mix with the soluble-glass-trass cement or plaster one or more of the following fibrous materials: burnt magnesia and magnesite, cork-meal, asbestos, mica, peat refuse, tanner's bark, india-rubber, with sulfur or shellac, asphalt, hair, wool, carrageen moss, cellulose of any kind, and also all animal or vegetable fibrous substances.

Before laying the stone or brick they are wet and the surface coated and impregnated with potash (or soda) soluble-glass-powder solution, and are then laid with mortar such as described, and immediately after the hardening of the mortar the whole structure or masonry is treated with the same solution or a similar solution or substance, as a clay solution or with silicic fluorhydric acid, whereby the cement or mortar is made to adhere better to the brick or stone and to become harder and more compact.

I claim—

1. The improvement in the art or process of building masonry of suitable building material which consists in wetting the building material with a soluble-glass solution, then laying the building material thus treated with mortar, allowing said mortar to dry and harden, and then increasing adherence between the building material and the mortar and increasing the hardness and solidity of the masonry by applying a similar solution to the whole construction of masonry.

2. The improvement in the art or process of building masonry of suitable building material which consists in wetting the building material with a soluble-glass solution, then laying the building material thus treated with mortar which when dry has at least as great strength as the building material, allowing said mortar to dry and harden, and then applying a similar solution to the whole construction of masonry.

3. The improvement in the art or process of building masonry of suitable building material which consists in wetting the building material with a soluble-glass solution, then laying the building material thus treated with mortar consisting of a soluble-glass-trass cement or plaster the strength of which is graduated by admixture of filling material in accordance with the strength of the building material, allowing said mortar to dry and harden, and then applying a similar solution to the whole construction of masonry.

4. Improved masonry consisting of stones or bricks the whole surface of each of which is coated and impregnated with soluble glass, cement or mortar joints having at least as great strength as the stones or bricks themselves, and the entire surface of the masonry being also coated and impregnated with soluble glass.

5. Improved masonry consisting of stones or bricks the whole surface of each of which is coated and impregnated with soluble glass, soluble-glass-trass cement or mortar joints having at least as great strength as the stones or bricks themselves, and the entire surface of the masonry being also coated and impregnated with soluble glass.

In witness whereof I have hereunto signed my name, this 17th day of January, 1901, in the presence of two subscribing witnesses.

CENEK LORENC.

Witnesses:
 VICTOR BENESZ,
 ADOLPH FISCHER.